(12) United States Patent
Yen

(10) Patent No.: US 8,258,716 B2
(45) Date of Patent: Sep. 4, 2012

(54) DRIVING POWER SUPPLY SYSTEM OF AN ACTIVE TYPE LED WITH MULTIPLE CHANNELS

(76) Inventor: Jui Chih Yen, Taipei (TW)

( * ) Notice: Subject to any disclaimer, the term of this patent is extended or adjusted under 35 U.S.C. 154(b) by 568 days.

(21) Appl. No.: 12/222,254

(22) Filed: Aug. 6, 2008

(65) Prior Publication Data

US 2010/0033112 A1 Feb. 11, 2010

(51) Int. Cl.
*H05B 37/02* (2006.01)

(52) U.S. Cl. ........ 315/291; 315/247; 315/276; 315/279; 315/307; 315/308; 315/312

(58) Field of Classification Search .......... 315/149–158, 315/312–326, 307–311, 297, 291, 274–279, 315/225, 224, 246, 247
See application file for complete search history.

(56) References Cited

U.S. PATENT DOCUMENTS

| | | | |
|---|---|---|---|
| 6,411,046 B1 * | 6/2002 | Muthu | 315/309 |
| 7,397,195 B2 * | 7/2008 | Yu et al. | 315/194 |
| 2005/0264242 A1 * | 12/2005 | Adamson et al. | 315/312 |
| 2008/0062680 A1 * | 3/2008 | Timmermans et al. | 362/223 |

* cited by examiner

*Primary Examiner* — Jacob Y Choi
*Assistant Examiner* — Anthony Arpin
(74) *Attorney, Agent, or Firm* — Jackson IPG PLLC

(57) ABSTRACT

An active type multiple channeled LED power driving system which includes seven regions, wherein power is lead-in through the first region with the EMC circuitry and the PWM circuitry, passing through the second region with the transformer, entering the third region with the CC & CV control circuitry, passing through the fourth region with two multiple channeled outputers, lead-in the fifth region having two intermittent modulating circuitries, outputting to the sixth region with the two LED lighting modules, and setting with environment parameters sensors in the seventh region, thereby raising the electronic typed heat dissipation rate and energy efficiency under the system operation to let the LED lamp be able to achieve its maximum performance.

1 Claim, 6 Drawing Sheets

DRIVING POWER SUPPLY SYSTEM OF AN ACTIVE TYPE LED WITH MULTIPLE CHANNELS

BACKGROUND OF THE INVENTION

In general, there are three kinds of output models in the driving power supply systems of ordinary light emitting diodes (LEDs). One is CV Mode (constant voltage mode), one is CC Mode (constant current mode) and the last one is the CC&CV Mode (constant voltage/constant current co-existing mode). However, the above power driving methods are not able to work out an active control of the best point in the working voltage and current. Due to variation in the climate temperature or an ill design in the heat dissipation of the LED lamp and lantern, it is easy to cause an adverse condition of over heat in the LED while being unable to control the environmental temperature, such that the lighting brightness and energy efficiency will be decreased and even cause a situation of burn out in the LED lighting module. FIG. 1 is a driving power system diagram of LED adopting CC&CV Mode (constant voltage/constant current co-existing mode) in the prior art. It mainly includes four operation regions. The power is led-in through the first region 10, and the regulating and filtering is proceeded by an electromagnetic compatibility (EMC) circuitry 11. Then, after it is adjusted by a pulse width modulation (PWM) circuitry 13 to raise its power (the working efficiency of its power supply can be raised up to over 80%). Voltage transformation is processed by a transformer 21 in the second region 20. It is then regulated and filtered to form desired power through the CC&CV control circuitry 31 in the third region 30 and output to a lighting module 61 in the last region 60. As seen here, the driving power system is a design which is totally unable to actively sense the ambient temperature or to make proper adjustment to the output. Therefore, it is easy to cause an adverse condition of over heat in the LED such that the lighting brightness and energy efficiency will be decreased and even cause a situation of burn out in the LED lighting module.

SUMMARY OF THE INVENTION

The present invention is related to an integrated operation system in a driving circuit of a lamp and lantern using an LED as its lamp power, and is especially designed for high powered LED lamps and lanterns. Its object is that the electrical heat dissipation rate and energy efficiency can be further raised under the system operation to let the LED lamp and lantern be able to achieve its maximum performance. The characteristics and effects of the present invention are now described hereafter in cooperation with the drawings.

DETAILED DESCRIPTION OF THE PREFERRED EMBODIMENT

Figure 1:
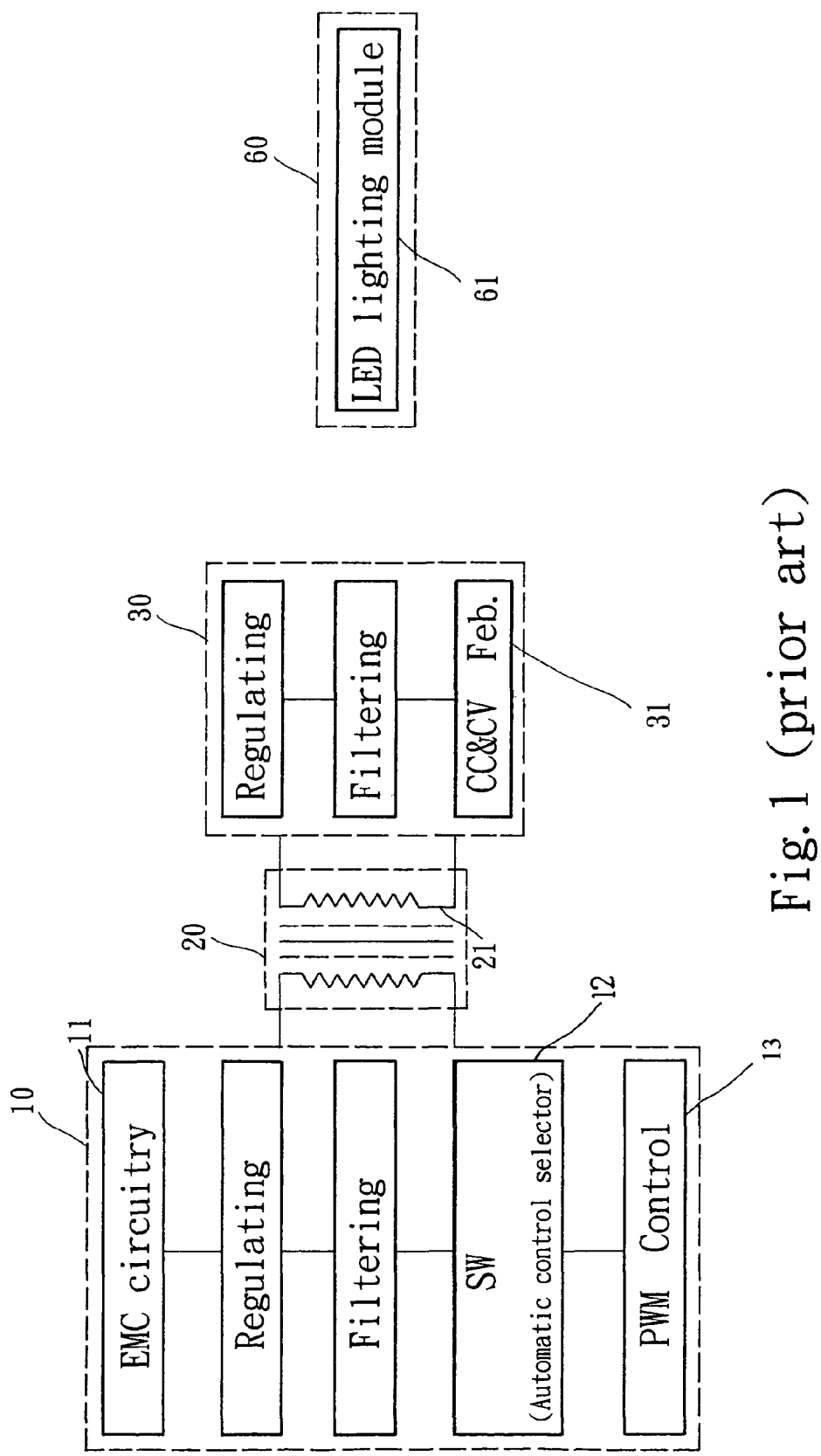
FIG. 1 is a driving power system diagram of LED adopting CC&CV Mode (constant voltage/constant current co-existing mode) in the prior art.
Figure 2:
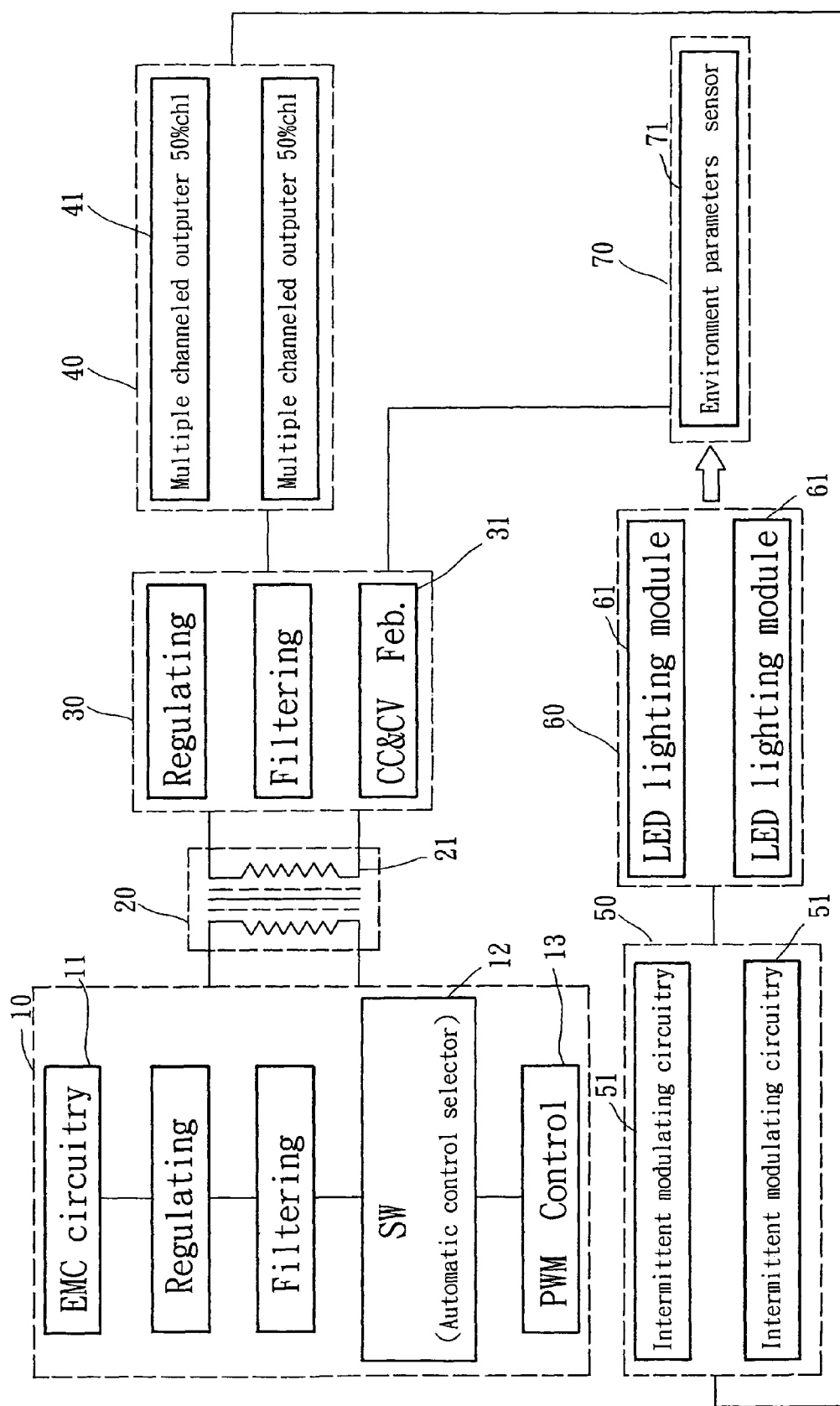
FIG. 2 is a driving power system diagram of an active type LED with multiple channels in the present invention.

The present invention provides an active type multiple channel LED power driving system, which is mainly designed for light source equipment using high power LED (s). It includes seven operation regions as shown in FIG. 2. The ordinary power is led-in through a first region 10, and at first the regulating is proceeded by EMC circuitry 11, then the filtering is judged by the SW 12 (automatic controlled selector). Voltage and current with insufficient performance is led into PWM circuitry 13 to raise its power (the working efficiency of its power supply can be raised up to over 80%). The voltage transformation is processed through a transformer 21 in a second region 20. After it is further regulated and filtered to form the optimum power through CC&CV (constant voltage/constant current) control circuitry 31 in a third region 30, and it proceeds equal ratio performance splitting in multiple channels by a plurality of outputers 41 providing multiple channels in a fourth region 40. The method can include, for example, led-in current-voltage from the third region 30 is 10V, and is split into 5V in two multiple channel outputers 41 of the fourth region 40. It then is led into a fifth region 50 having the same number of intermittent modulating circuitry 51 channels as the number of multiple channel outputers 41 such that the original DC (direct current) power output is modulated into intermittent electric power capable of controlling the desired output frequency and width of period. It further is output to a sixth region 60 having the same numbers of LED lighting modules 61 as the number of channels of intermittent modulating circuitry 51 to proceed with light source activation. In another embodiment of intermittent modulating method, one intermittent modulating circuit 51 in the fifth region 50 integrates and receives each 5V anode current voltage from two multiple channeled outputers 41 of the fourth region 40 and forms a 10V then outputs to the sixth region 60 for the provision of activation in one LED lighting module 61. Another intermittent modulating circuit 51 in the fifth region 50 integrates and receives each 5V cathode current voltage from two multiple channeled outputers 41 of the fourth region 40 and forms a 10V then outputs to the sixth region 60 for the provision of activation in another LED lighting modules 61. These two intermittent modulating circuits 51 do not simultaneously output and do not simultaneously activate the respective two LED lighting modules 61, but in an extremely spontaneous intermittent alternative way of output. Of course, the two LED lighting modules 61 in the sixth region 60 also use an extremely spontaneous intermittent alternative way to activate and emit the light source. This spontaneous intermittent alternative light source cannot be detected by vision. Therefore, those shown in the sixth region 60 are a kind of natural light source. Furthermore, an environment parameters sensor 71 of the seventh region 70 can sense temperature changes in the whole system and ambient, and feedback the temperature coefficients of the LED lighting module 61 to the CC&CV control circuitry 31 in the third region 30 to proceed with adjustment and judgment in its curve of output voltage and current. Through this, it can achieve an active electrical heat dissipation and multiple channel split output to raise energy efficiency thus facilitating the LED lamp and lantern to achieve maximum performance without occurrence of an adverse condition of LED over heat which may decrease the LED lighting brightness and energy efficiency, and even lead to the situation of burn out in the LED lighting module.

Figure 3:
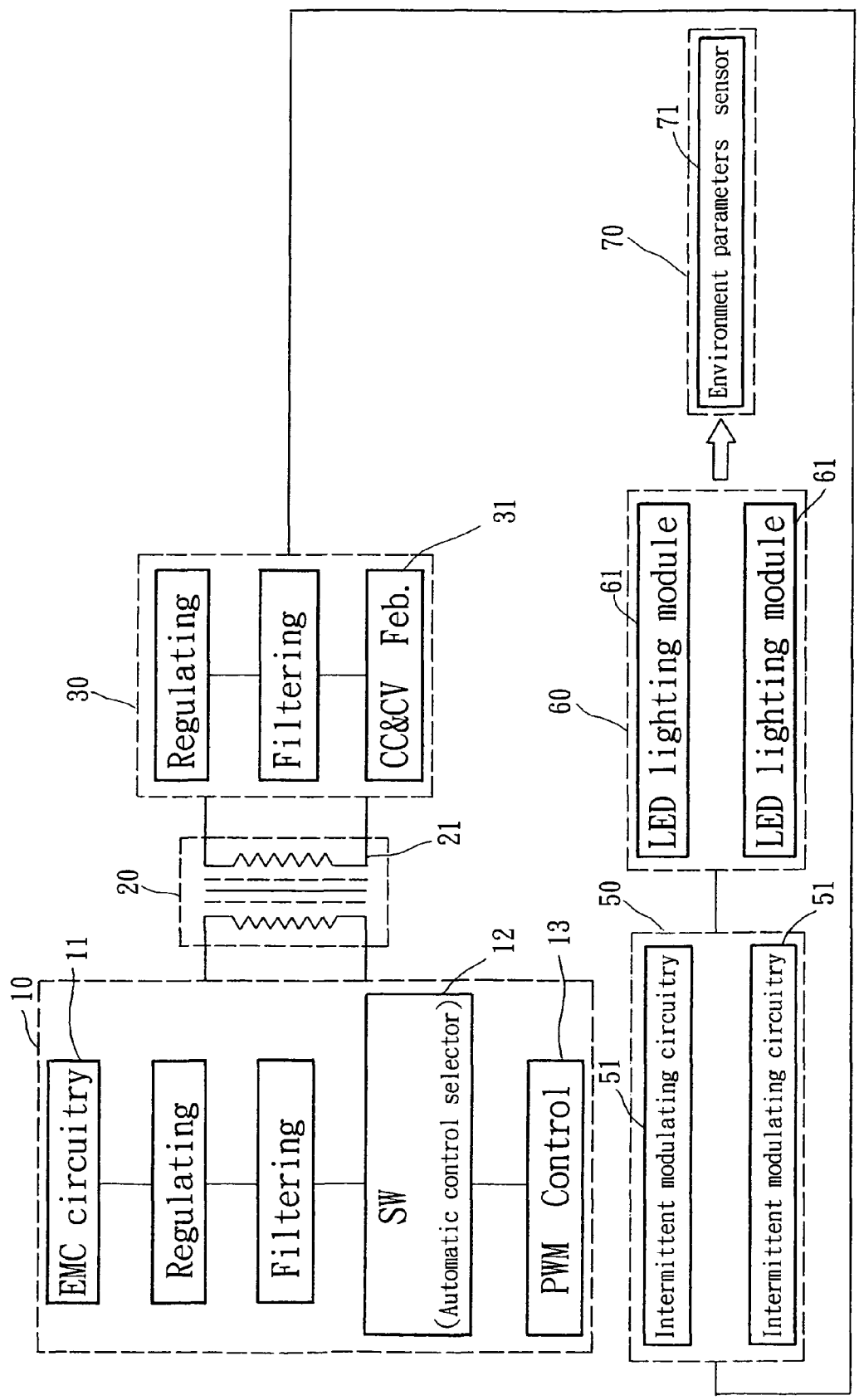
FIG. 3 is a second embodiment diagram of the present invention.

Please refer to FIG. 3 that illustrates a second embodiment of the present invention. It is characterized in that the LED power driving system can omit the fourth region 40 and outputers 41 with multiple channels. After the power is regulated and filtered to form the optimum power directly through the CC&CV (constant voltage/constant current) control circuitry 31 in a third region 30, the original DC (direct current) power output is output and modulated into an intermittent electric power capable of controlling the output frequency and width of period through intermittent modulating circuitry 51 in the fifth region 50. It is then output to a sixth region 60 having the same numbers of LED lighting modules 61 as the number of intermittent modulating circuitry channels 51 before proceeding to a light source activation operation. An environment parameters sensor 71 in a seventh region 70 is utilized to feedback the temperature coefficients of the LED lighting modules 61. The coefficients are provided to the CC&CV control circuitry 31 in the third region 30 to proceed with adjustment and judgment of its curve of output voltage and current. Although this embodiment is unable to use a multiple channel split output to raise energy efficiency, it can achieve an active electrical heat dissipation to assure the utilization efficiency of the LED lamp and lantern.

Figure 4:
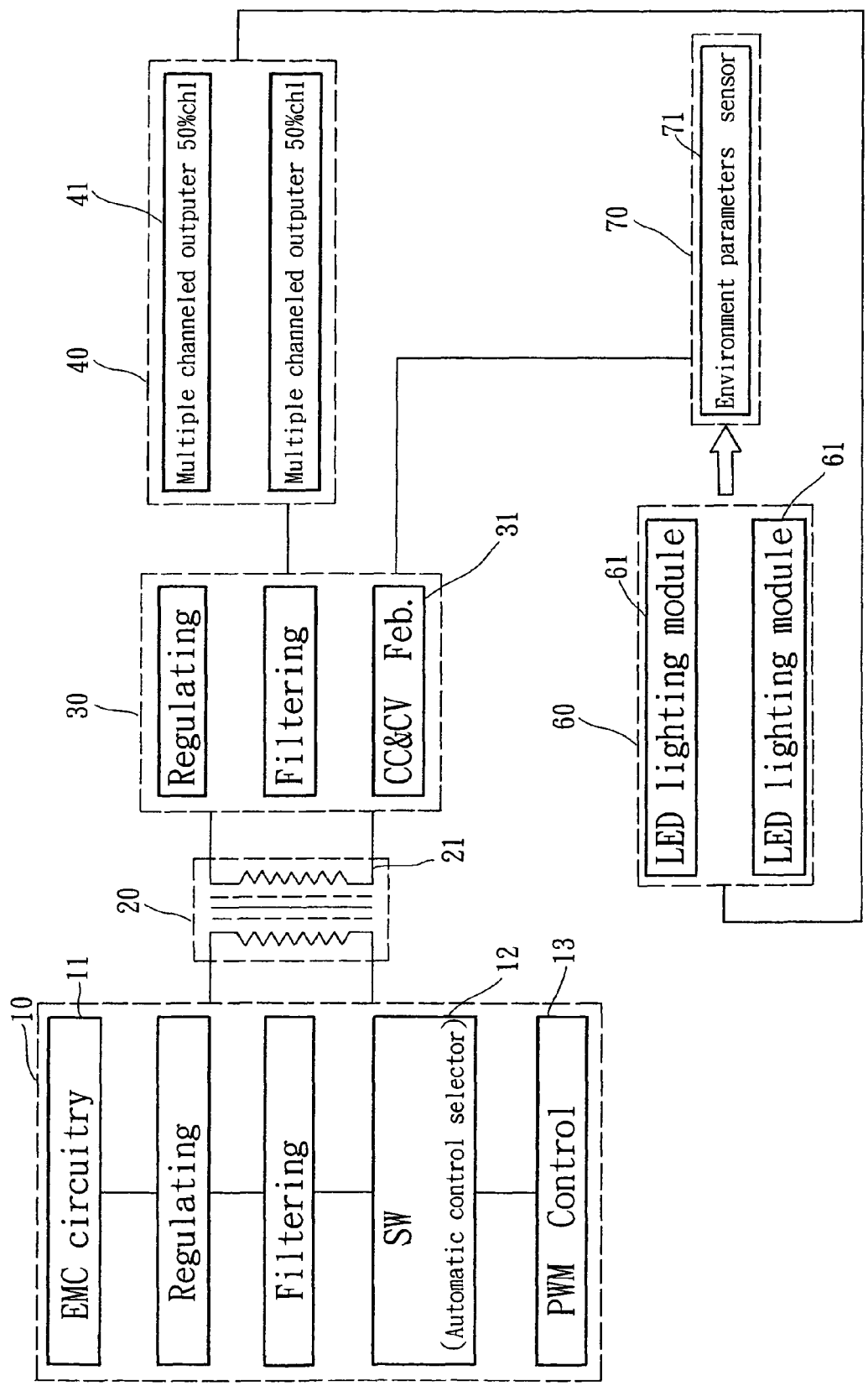
FIG. 4 is a third embodiment diagram of the present invention.

Please refer to FIG. 4 that illustrates a third embodiment of the present invention. It is characterized in that the LED power driving system omits the fifth region 50 and multiple intermittent modulating circuit channels 51. After the power is regulated and filtered to form the optimum power directly through the CC&CV (constant voltage/constant current co-existing mode circuitry) control circuitry 31 in a third region 30, it is output to a sixth region 60 via a proportional performance splitting method by outputers 41 with multiple channels in the fourth region 40 and directly provided to a lighting module 61 for proceeding to a light source activation operation. An environment parameters sensor 71 in a seventh region 70 is utilized to feedback the temperature coefficients of the LED lighting module 61. The coefficients are provided to the CC&CV control circuitry 31 in the third region 30 to proceed with adjustment and judgment of its curve of output voltage and current. Although this embodiment is unable to use an integrated split modulating method to raise energy efficiency, it still can achieve an active electrical heat dissipation to assure the utilization efficiency of the LED lamp and lantern.

Figure 5:
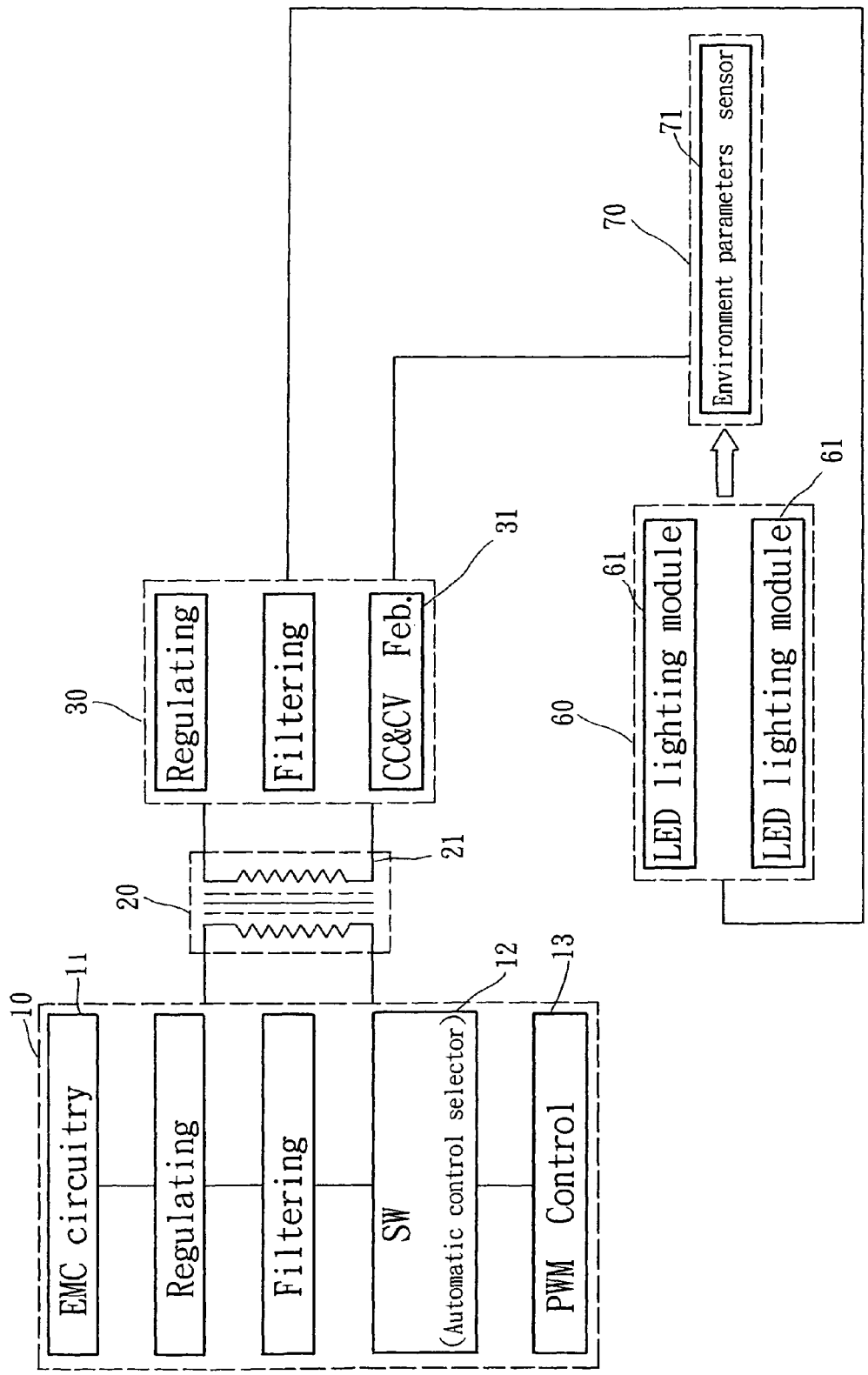
FIG. 5 is a fourth embodiment diagram of the present invention.

Please refer to FIG. 5 that illustrates a fourth embodiment of the present invention. It is characterized in that the LED power driving system omits the fourth region 40 and the fifth region 50. After the power is regulated and filtered to form the optimum power directly through the CC&CV (constant voltage/constant current co-existing mode circuitry) control circuitry 31 in a third region 30, it is output to a sixth region 60 and directly provided to a LED lighting module 61 for proceeding with a light source activation operation. An environment parameters sensor 71 in a seventh region 70 is utilized to feedback the temperature coefficients of the LED lighting module 61. The coefficients are provided to the CC&CV control circuitry 31 in the third region 30 to proceed with adjustment and judgment of its output voltage and current. Although this embodiment is unable to use an integrated split modulating method to raise energy efficiency, it still can achieve an active electrical heat dissipation to assure the utilization efficiency of the LED lamp and lantern.

Figure 6:
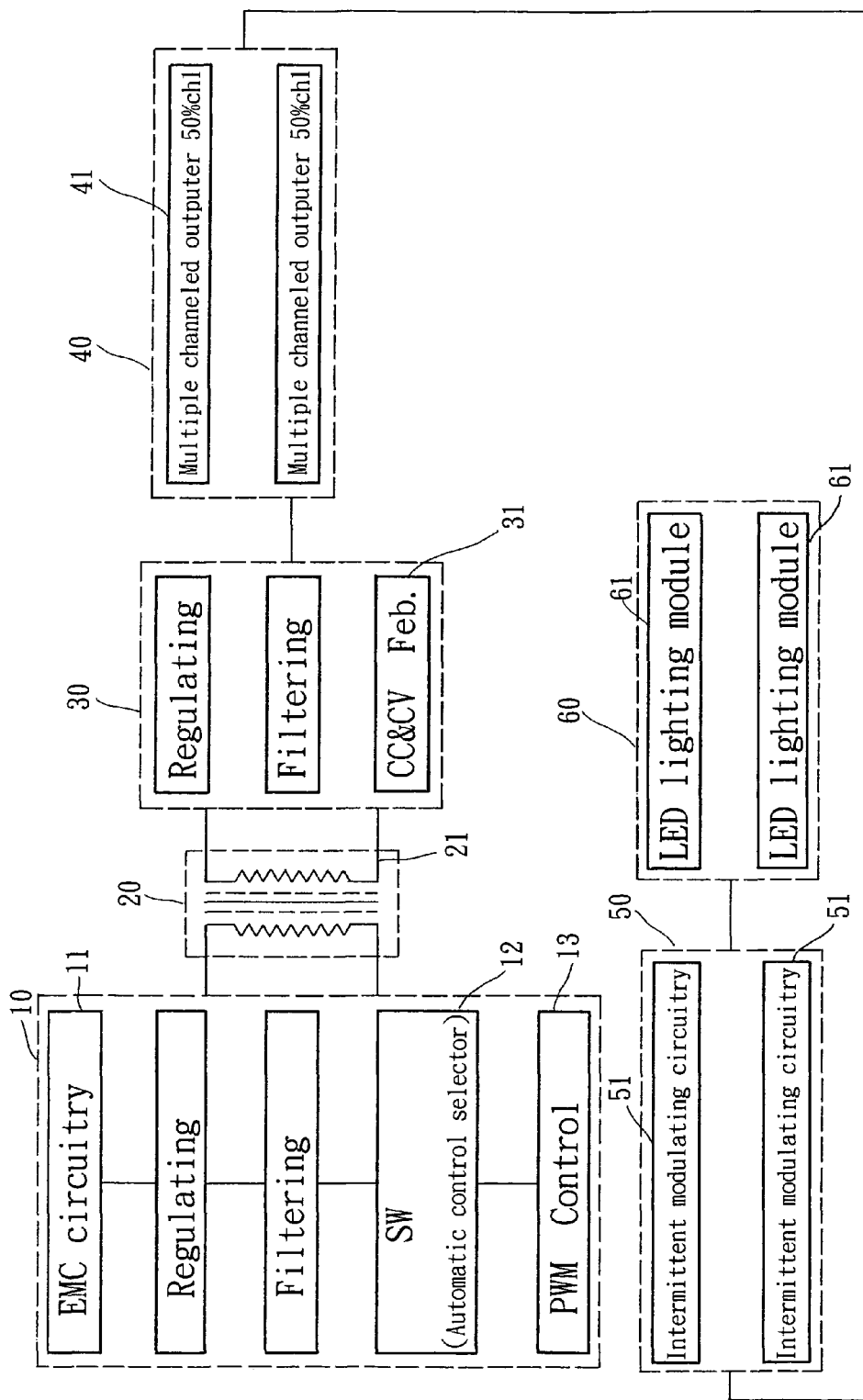
FIG. 6 is a fifth embodiment diagram of the present invention.

Please refer to FIG. 6 that illustrates a fifth embodiment of the present invention which omits the environment parameters sensor 71 in a seventh region 70. The aforementioned description is only explanatory but not limited. The ordinary technicians in the present area can realize that there are many modifications, variations or equivalents that may be done without leaving the spirit and range of the following claims, but these shall all fall under the protection range of the present invention.

I claim:

1. An active type multiple channel LED power driving system comprising:
    a first operation region comprising electromagnetic compatibility (EMC) circuitry, a first regulating circuit connected to the EMC circuitry, a first filtering circuit connected to the first regulating circuit, an automatic control selector connected to the first filtering circuit, and a pulse width modulation (PWM) circuitry connected to the automatic control selector;
    a second operation region connected to the first operation region and comprising a transformer for processing voltage transformation;
    a third operation region connected to the second operation region and comprising a second regulating circuit for further regulating, a second filtering circuit connected to the second regulating circuit for further filtering, and a constant voltage/constant current (CC&CV) co-existing mode circuitry connected with the second filtering circuit for outputting a first voltage;
    a fourth operation region connected to the third operation region and comprising two or more multiple channel outputers, in which the first voltage received from the third operation region is equally divided by a number equal to a number of the multiple channel outputers to give second voltages with equal magnitude;
    a fifth operation region connected to the fourth operation region and comprising an equal amount of intermittent modulating circuits to the number of the multiple channel outputers, each of the intermittent modulating circuits alternately receiving the second voltages from all of the multiple channel outputers to integrate the second voltages into the first voltage and then alternately and intermittently output the first voltage;
    a sixth operation region connected to the fifth operation region and comprising a number of LED lighting modules equal to the number of the intermittent modulating circuits, each of the LED lighting modules being electrically connected to a different one of the intermittent modulating circuits to receive the first voltage; and
    a seventh operation region connected to the sixth operation region and comprising an environment parameter sensor for detecting an environment parameter of the LED lighting modules for adjusting the output of the constant voltage/constant current co-existing mode circuitry;
    wherein power is led in through the first region with the EMC circuitry and the PWM circuitry, through the second region with the transformer, through the third region with the constant voltage/constant current co-existing mode circuitry, through the fourth region with the multiple channel outputers, through the fifth region having the intermittent modulating circuitries, and output to the sixth region with the LED lighting modules, and setting with environment parameters sensors in the seventh region.

* * * * *